US011984839B2

(12) United States Patent
Allias et al.

(10) Patent No.: US 11,984,839 B2
(45) Date of Patent: May 14, 2024

(54) PROPULSIVE ELECTRIC MOTOR SET WITH ELECTRIC GENERATOR

(71) Applicant: Airbus Operations SAS, Toulouse (FR)

(72) Inventors: Jean-François Allias, Toulouse (FR); Olivier Raspati, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 17/713,581

(22) Filed: Apr. 5, 2022

(65) Prior Publication Data

US 2022/0329181 A1 Oct. 13, 2022

(30) Foreign Application Priority Data

Apr. 7, 2021 (FR) ........................ 2103537

(51) Int. Cl.
*H02P 7/343* (2016.01)
*B64D 27/24* (2006.01)

(52) U.S. Cl.
CPC ............. *H02P 7/343* (2013.01); *B64D 27/24* (2013.01)

(58) Field of Classification Search
CPC ........ H02K 11/0094; H02K 1/14; H02K 1/17; H02K 21/12; H02K 16/04; H02K 1/27; H02K 11/33; B64D 15/12; B64D 27/24; B64C 11/00; B64C 11/44; H02P 6/14; H02P 7/343; H01F 38/18; B64U 50/19; Y02T 50/40

See application file for complete search history.

(56) References Cited

U.S. PATENT DOCUMENTS

2020/0052541 A1\* 2/2020 Wollenberg ............ H02K 3/505
2021/0039783 A1 2/2021 Weekes et al.
2021/0075303 A1\* 3/2021 Seminel ............. H02K 11/0094

OTHER PUBLICATIONS

French Search Report; priority document.
V. Madonna et al., "Electrical Power Generation in Aircraft: Review, Challenges, and Opportunities" IEEE Transactions on Transportation Electrification, vol. 4, No. 3, Sep. 2018.

\* cited by examiner

*Primary Examiner* — Said Bouziane
(74) *Attorney, Agent, or Firm* — Greer, Burns & Crain, Ltd.

(57) ABSTRACT

A propulsive electric motor set for aircraft includes an electrical energy source and an electric motor provided with a drive shaft on which is mounted a propeller. The electric motor includes a first set of windings linked to the electrical energy source to provide a rotational drive function for the drive shaft. The electric motor further includes a second set of windings which, when the drive shaft is driven in rotation by an electric powering of the first set of windings, provides an electric generation function configured to supply non-propulsive loads of the aircraft. Thus, the non-propulsive loads of the aircraft can be electrically powered without any overload compromising the aerodynamics of the aircraft.

6 Claims, 3 Drawing Sheets

PROPULSIVE ELECTRIC MOTOR SET WITH ELECTRIC GENERATOR

CROSS-REFERENCES TO RELATED APPLICATIONS

This application claims the benefit of the French patent application No. 2103537 filed on Apr. 7, 2021, the entire disclosures of which are incorporated herein by way of reference.

FIELD OF THE INVENTION

The invention relates to a propulsive electric motor set for aircraft which, in addition to a drive function for the propeller, provides an electric generation function to electrically power non-propulsive loads of the aircraft. The invention relates also to an aircraft equipped with at least one such propulsive electric motor set.

BACKGROUND OF THE INVENTION

Aircraft are often propelled by turbine engines. Then, to electrically power equipment on board these aircraft (non-propulsive loads), an auxiliary electric generator powered by kerosene is used. This is called an auxiliary power unit APU. As a variant, mechanical offtakes are provided on the rotation shafts of the turbine engines, for example on high-pressure (HP) shafts of high-bypass engines. The rotation of the engine shaft is then converted into electrical energy by an electric generator, such as a variable frequency generator VFG, to electrically power onboard equipment.

The aircraft may as a variant be propelled using electric motors. However, providing a mechanical offtake on a rotation shaft of such a motor for electrically powering equipment on board these aircraft (non-propulsive loads) requires the addition of a gearbox on the output shaft of the electric motor. The addition of this gearbox would lead to a not insignificant weight increase. Above all, the addition of this gearbox would significantly increase the bulk, which would incur a significant additional volume to be incorporated at the motor sets (propulsion units) and would compromise the aerodynamics of the aircraft (drag penalty).

Given that the electric motors used to propel aircraft are typically powered by fuel cells, DC/DC converters could be parallelized to electrically power equipment on board the aircraft (non-propulsive loads) from these fuel cells. However, this approach would entail a significant quantity of DC/DC converters, which would increase the weight and the bulk, and would commensurately increase the risk of such a DC/DC converter failing.

It is therefore desirable to provide a solution which mitigates these various drawbacks of the state of the art. More particularly, it is desirable to provide an electric power supply solution for non-propulsive loads on board an aircraft, which is of small bulk and which does not compromise the aerodynamics of the aircraft.

SUMMARY OF THE INVENTION

To this end, a propulsive electric motor set for aircraft is proposed, comprising an electrical energy source and an electric motor provided with a drive shaft on which is mounted a propeller, the electric motor comprising a first set of windings linked to the electrical energy source and arranged to provide a rotational drive function for the drive shaft. The electric motor further comprises a second set of windings which, when the drive shaft is driven in rotation by an electric powering of the first set of windings, is arranged to provide an electric generation function intended to supply non-propulsive loads of the aircraft. Thus, the non-propulsive loads of the aircraft can be electrically powered without any overload compromising the aerodynamics of the aircraft.

According to a particular embodiment, the first set of windings is included in a first stator installed so as to be secured to a casing of the electric motor, the second set of windings is included in a second stator installed also so as to be secured to the casing, and the first and second stators are coupled to one and the same rotor installed so as to be secured to the drive shaft.

According to a particular embodiment, the second stator is installed in the casing between the first stator and a bottom of the casing at the non-drive end.

According to a particular embodiment, the electrical energy source is a set of fuel cells.

According to a particular embodiment, the propeller is free-wheel mounted on the drive shaft such that, when the drive shaft rotates in one direction, the drive shaft is engaged with the propeller and drives the propeller in rotation, and, when the drive shaft rotates in the other direction through a phase-shift by $\pi$ of the electric power supply of the first set of windings, the drive shaft rotates freely without driving the propeller.

According to a particular embodiment, the propulsive electric motor set comprises a DC/AC converter which is arranged to convert a direct current generated by the electrical energy source into alternating current supplying the first set of windings and which is controlled to apply a phase-shift by $\pi$ to the electric power supply of the first set of windings to change the direction of rotation of the drive shaft.

According to a particular embodiment, the propulsive electric motor set comprises: a DC/AC converter arranged to convert a direct current generated by the electrical energy source into alternating current supplying the first set of windings; another electrical energy source; and another DC/AC converter arranged to convert a direct current generated by the other electrical energy source into alternating current supplying the first set of windings and which is arranged to generate an electric power supply phase-shifted by $\pi$. The DC/AC converters are controlled to be activated mutually exclusively.

Also proposed is an aircraft comprising at least one propulsive electric motor set as described above in any one of its embodiments, supplying non-propulsive loads of the aircraft.

According to a particular embodiment, the aircraft comprises at least one additional electrical power source arranged to temporarily take over from the second set of windings and electrically power the non-propulsive loads of the aircraft when the electric motor has to be stopped.

BRIEF DESCRIPTION OF THE DRAWINGS

The features of the invention mentioned above, and others, will emerge more clearly on reading the following description of at least one exemplary embodiment, the description being given in relation to the attached drawings, in which.

DETAILED DESCRIPTION OF THE PREFERRED EMBODIMENTS

Figure 1:
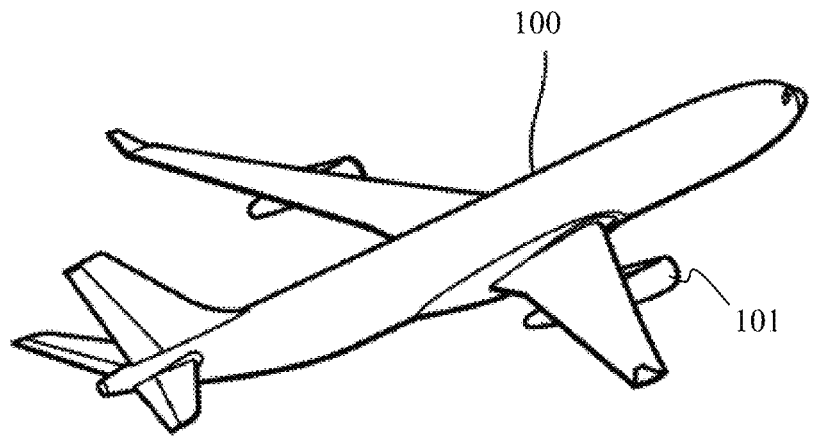
FIG. 1 schematically illustrates an aircraft equipped with at least one propulsive electric motor set arranged to supply electric power to non-propulsive loads of the aircraft.

FIG. 1 schematically illustrates an aircraft 100. The aircraft 100 is equipped with at least one propulsive electric motor set 101. This is also called "propulsion unit".

Figure 2:
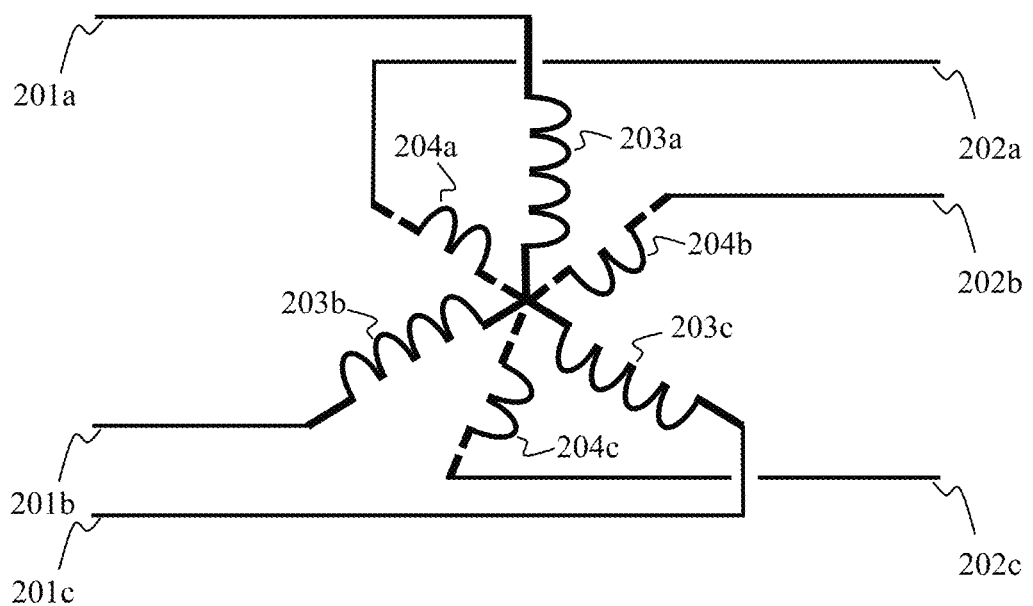
FIG. 2 schematically illustrates first and second sets of windings of the propulsive electric motor set.

Each propulsive electric motor set 101 is arranged and installed on the aircraft to supply a propulsive power to the aircraft 100. At least one such propulsive electric motor set 101 is arranged to also supply electric power to non-propulsive loads of the aircraft 100, such as the avionics, the air conditioning, cabin control, etc., that is to say, electrical equipment not connected to the propulsion of the aircraft 100. To do this, a particular arrangement of the first and second sets of windings is produced, as schematically illustrated in FIG. 2. The first set of windings provides a motor drive function, the second set of windings provides an electric generation function.

The propulsive electric motor set 101 comprises an electric motor electrically powered by an electrical energy source, preferentially a set of fuel cells. The electric motor comprises a rotor and at least one stator.

In a particular embodiment, the first set of windings (motor drive function) is included in a first stator installed so as to be secured to a casing of the electric motor. The second set of windings (electric generation function) is included in a second stator installed also so as to be secured to the casing of the electric motor. The first and second stators are coupled to the same rotor installed so as to be secured to the drive shaft (or output shaft) of the electric motor. Preferentially, the second stator is installed in the casing between the first stator and the bottom of the casing at the non-drive end. One advantage of this arrangement is to increase the ease of lubrication, that being shared between the motor drive and electric generation functions. As a variant, a single stator comprises the first set of windings and the second set of windings.

The electric motor receives the electric power supply, supplied by the electrical energy source, by electrical links 201a, 201b, 201c connected to respective windings 203a, 203b, 203c forming the first set of windings. The electrical energy supplied by the electrical energy source is thus converted into rotational movement by virtue of the first set of windings.

The electric motor also comprises the second set of windings, which ensures the electric generation function. The electric motor is therefore also an electrical power source via electrical links 202a, 202b, 202c connected to respective windings 204a, 204b, 204c forming the second set of windings.

The windings of the second set of windings are of smaller dimensions that the windings of the first set of windings. The difference in dimensioning of the windings between the two sets allows the electric motor to provide the thrust specified for the requirements of the aircraft.

Thus, when the electric motor is powered by means of the first set of windings, its rotation produces a current in the second set of windings, which supplies an auxiliary electric power making it possible to supply the non-propulsive loads of the aircraft 100. This arrangement offers a solution that is easy to incorporate and of small bulk, which does not therefore compromise the aerodynamics of the aircraft 100.

Figure 3:
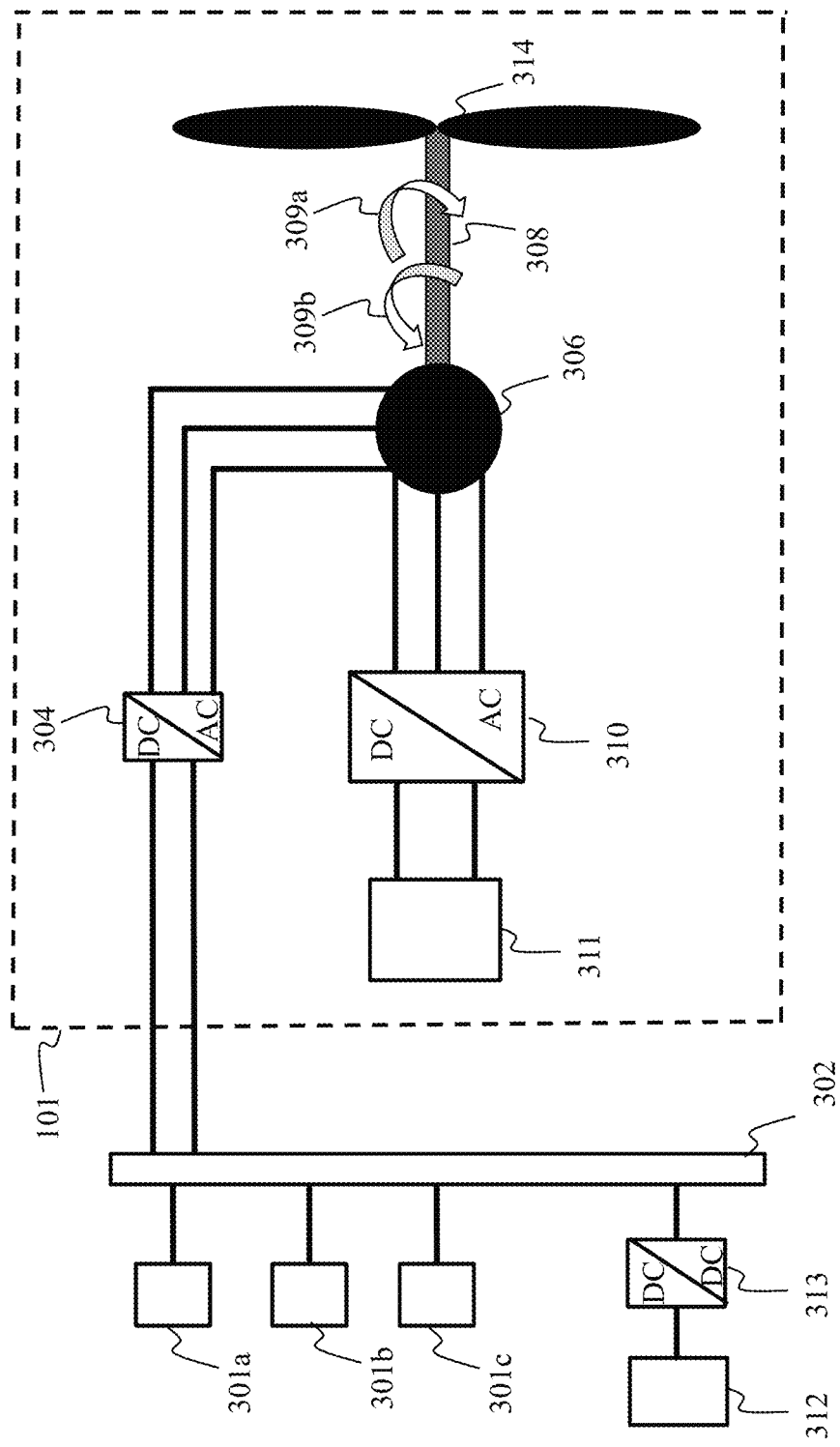
FIG. 3 schematically illustrates a first embodiment of the propulsive electric motor set.

FIG. 3 schematically illustrates a first embodiment of the propulsive electric motor set 101.

The propulsive electric motor set 101 comprises an electric motor 306 arranged as previously described in relation to FIG. 2. The electric motor comprises a drive shaft 308, or output shaft, on which is mounted a propeller 314 configured to propel the aircraft 100.

The propulsive electric motor set 101 then comprises the abovementioned electrical energy source 311. The propulsive electric motor set 101 is thus a monolithic block which includes its own electric power supply system, which facilitates the mounting thereof when the aircraft 100 is being constructed. The electrical energy source 311 may, however, as a variant, be external to the propulsive electric motor set 101.

In a particular embodiment, the electrical energy source 311 is a fuel cell or, preferentially, a set of fuel cells, such as hydrogen cells.

The propulsive electric motor set 101 further comprises a DC/AC converter 310. The DC/AC converter 310 converts the direct current generated by the electrical energy source 311 into alternating current supplying the first set of windings (motor drive function), for example in three-phase mode. The DC/AC converter 310 may, as a variant, be external to the propulsive electric motor set 101, typically grouped together with the electrical energy source 311.

The propulsive electric motor set 101 further comprises an AC/DC converter 304. The AC/DC converter 304 converts the alternating current, for example three-phase, generated by the second set of windings (electric generation function), into direct current intended to supply non-propulsive loads 301a, 301b, 301c of the aircraft 100.

The propulsive electric motor set 101 may, for example, electrically power the non-propulsive loads 301a, 301b, 301c via a busbar 302. The busbar 302 may be internal or external to the propulsive electric motor set 101. The busbar 302 may be linked to an additional electric power supply 312, located outside the propulsive electric motor set 101, typically via a DC/DC converter 313. This additional electric power supply 312, such as a battery, is used to temporarily take over from the second set of windings (electric generation function) and to electrically power non-propulsive loads when the electric motor 306 has to be stopped.

Thus, the propulsive electric motor set 101 electrically powers the non-propulsive loads 301a, 301b, 301c with a low bulk cost which does not compromise the aerodynamics of the aircraft 100.

The regulations may, in certain circumstances when the aircraft 100 is on the ground, prohibit the propeller 314 from being actuated in rotation, for safety reasons. In such circumstances, the electric motor 306 must be stopped, which deactivates the electric generation function provided by the second set of windings. However, a particular embodiment detailed hereinbelow makes it possible to limit the recourse to the additional electric power supply 312 and reduce the dimensioning thereof.

In this particular embodiment, the propeller 314 is freewheel mounted on the drive shaft 308. In other words, when the drive shaft 308 rotates in one direction 309a, the drive shaft 308 is engaged with the propeller 314 and drives the propeller 314 in rotation; and, when the drive shaft 308 rotates in the other direction 309b, the drive shaft 308 rotates freely without driving the propeller 314.

Thus, when the propeller 314 is allowed to rotate, the DC/AC converter 310 is configured to supply the electric motor 306 so as to make the drive shaft 308 rotate in the direction 309a and therefore drive the propeller 314 in rotation. And, when the propeller 314 is not allowed to rotate, the DC/AC converter 310 is configured to supply the electric motor 306 so as to make the drive shaft 308 rotate in the other direction 309b, by virtue of a phase shift by π of the power supply current. In this case, the drive shaft 308 rotates freely without driving the propeller 314. Thus, the second set of windings produces electric current allowing the non-propulsive loads 301a, 301b, 301c to be electrically powered even when the propeller 314 is not allowed to rotate. Preferentially, the additional electric power supply 312 is used as stopgap electric power supply for the non-propulsive loads 301a, 301b, 301c during a phase of change of direction of rotation of the electric motor 306.

The AC/DC converter 304 is configured to take account of the phase-shift by π of the power supply current of the first set of windings and therefore of the current generated by the second set of windings. The AC/DC converter 304 is configured to switch over operating mode synchronously with the DC/AC converter 310.

Figure 4:
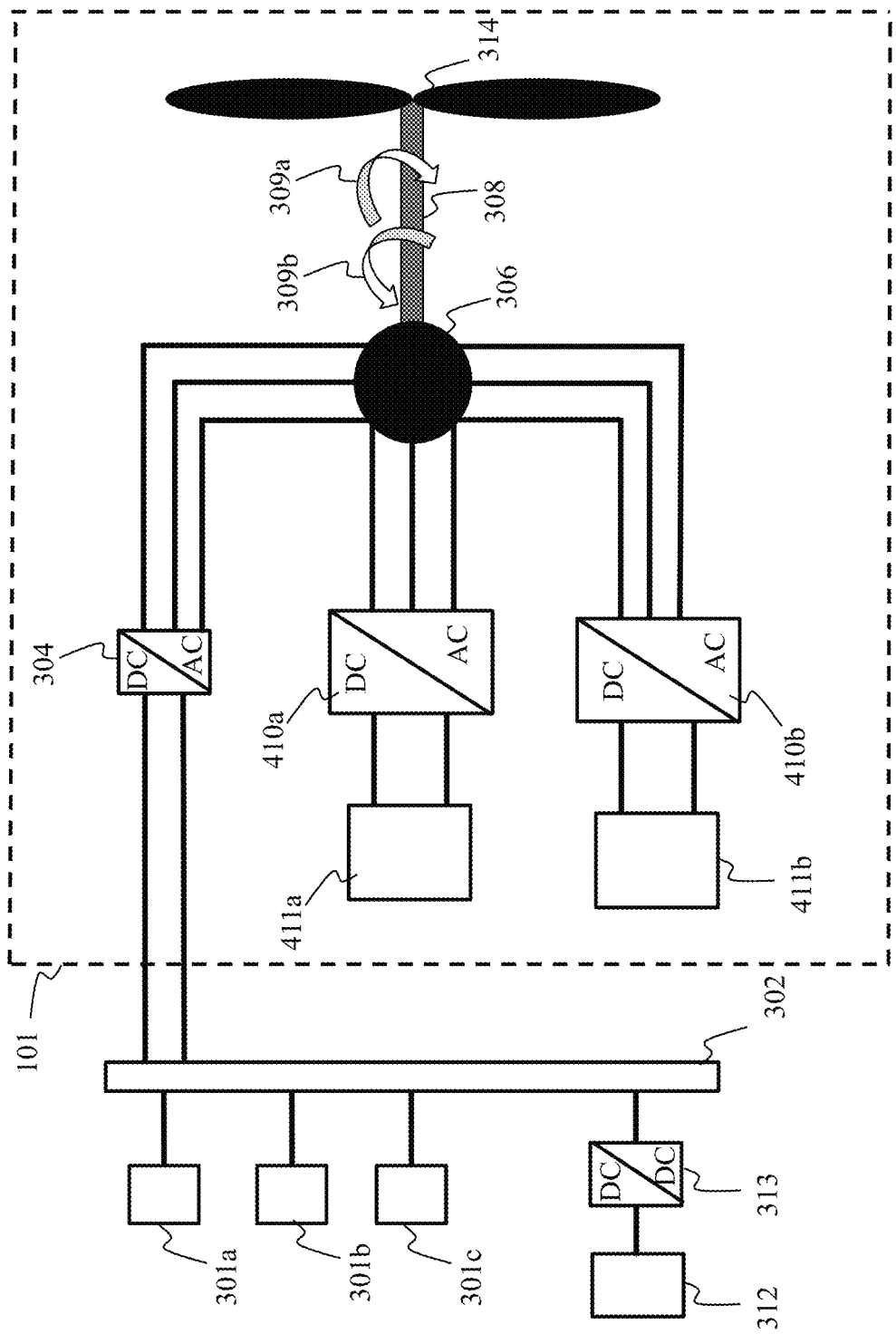
FIG. 4 schematically illustrates a second embodiment of the propulsive electric motor set.

Another particular embodiment in which the propeller 314 is free-wheel mounted on the drive shaft 308 is schematically illustrated in FIG. 4. Two electrical energy sources 411a, 411b are used instead of the electrical energy source 311. The electrical energy sources 411a, 411b are fuel cells or, preferentially, sets of fuel cells, such as hydrogen cells. Two DC/AC converters 410a, 410b are then used instead of the DC/AC converter 310 (one converter for each electrical energy source 411a, 411b). Each of the two DC/AC converters 410a, 410b is linked to the first set of windings.

The DC/AC converter 410a is configured to supply the electric motor 306 so as to make the drive shaft 308 rotate in the direction 309a and therefore drive the propeller 314 in rotation. The DC/AC converter 410b is configured to supply the electric motor 306 so as to make the drive shaft 308 rotate in the other direction 309b, without driving the propeller 314 in rotation, therefore with a phase-shift by π with respect to the electric power supply supplied by the DC/AC converter 410 a.

The power supply by the DC/AC converter 410a is therefore activated when the propeller 314 is allowed to rotate and is deactivated when the propeller 314 is not allowed to rotate. Conversely, the power supply by the DC/AC converter 410b is therefore activated when the propeller 314 is not allowed to rotate and is deactivated when the propeller 314 is allowed to rotate. The DC/AC converters 410a, 410b are therefore activated mutually exclusively.

The AC/DC converter 304 is configured to take account of the phase-shift by π of the power supply current of the first set of windings and therefore of the current generated by the second set of windings. The AC/DC converter 304 is configured to switch over operating modes synchronously with the DC/AC converters 410a, 410b.

The configuration of the DC/AC converters 304, 310, 410a, 410b to control the rotation of the drive shaft in one direction or in the other is produced by one or more controllers. These controllers may be internal or external to the propulsive electric motor set 101. These controllers may be microcontrollers, or processors or DSP (digital signal processor chip) components, executing computer program instructions stored in memory and organizing the control of the DC/AC converters 310, 410a, 410b. These controllers may be dedicated components or sets of components (or "chipsets"), such as FPGA (Field-Programmable Gate Array) or ASIC (Application-Specific Integrated Circuit) components. These controllers thus comprise electronic circuitry configured to provide the desired control of the DC/AC converters 304, 310, 410a, 410b. These controllers act on instructions conveyed by signals originating from the cockpit of the aircraft 100 (motor activation without rotation of the propeller or with rotation of the propeller).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsive electric motor set for aircraft, comprising an electrical energy source,
   an electric motor provided with a drive shaft on which is mounted a propeller,
      the electric motor comprising a first set of windings linked to said electrical energy source and arranged to provide a rotational drive function to rotate the drive shaft in a first direction,
   a second set of windings which, when the drive shaft is driven in rotation in a second direction opposite the first direction by an electric powering of the first set of windings, is arranged to provide an electric generation function configured to supply non-propulsive loads of the aircraft,
   wherein the propeller is coupled to the drive shaft such that the propeller is engaged with the drive shaft when the drive shaft is rotated in the first direction, and the propeller is disengaged with the drive shaft when the drive shaft is rotated in the second direction, and,
   wherein the propeller is free-wheel mounted on the drive shaft such that, when the drive shaft rotates in one direction, the drive shaft is engaged with the propeller and drives the propeller in rotation, and when the drive shaft rotates opposite to the direction through a phase-shift by π of an electric power supply of the first set of windings, the drive shaft rotates freely without driving the propeller.

2. The propulsive electric motor set according to claim 1, wherein the electrical energy source is a set of fuel cells.

3. The propulsive electric motor set according to claim 1, comprising a DC/AC converter which is configured to convert a direct current generated by the electrical energy source into alternating current supplying the first set of windings and which is controlled to apply a phase-shift by π to the electric power supply of the first set of windings to change a direction of rotation of the drive shaft.

4. The propulsive electric motor set according to claim 1, further comprising:
   a DC/AC converter configured to convert a direct current generated by the electrical energy source into alternating current supplying the first set of windings;
   another electrical energy source;
   another DC/AC converter configured to convert another direct current generated by another electrical energy source into alternating current supplying the first set of windings and which is arranged to generate an electric power supply phase-shifted by $\pi$; and wherein the DC/AC converters are controlled to be activated mutually exclusively.

5. An aircraft comprising at least one propulsive electric motor set according to claim 1 supplying non-propulsive loads of the aircraft.

6. The aircraft according to claim 5, comprising at least one additional electrical power source configured to temporarily take over from the second set of windings and electrically power the non-propulsive loads of the aircraft when the electric motor has to be stopped.

* * * * *